United States Patent
Furuya (10) Patent No.: US 7,859,713 B2
(45) Date of Patent: Dec. 28, 2010

(54) PRINTING CONTROL APPARATUS, METHOD AND PRINTER DRIVER

(75) Inventor: Tomoyuki Furuya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1085 days.

(21) Appl. No.: 10/773,423

(22) Filed: Feb. 9, 2004

(65) Prior Publication Data

US 2004/0160621 A1 Aug. 19, 2004

(30) Foreign Application Priority Data

Feb. 13, 2003 (JP) .............................. 2003-035319

(51) Int. Cl.
*G06F 3/12* (2006.01)
(52) U.S. Cl. ...................................... 358/1.3
(58) Field of Classification Search ........................ None
See application file for complete search history.

(56) References Cited

U.S. PATENT DOCUMENTS 6,456,404 B1    9/2002   Furuya et al. ............... 358/523
6,490,055 B1* 12/2002   Shimizu ...................... 358/1.9
6,853,465 B1*   2/2005   Ohnishi ....................... 358/1.9

FOREIGN PATENT DOCUMENTS

| JP | 09-30056 | 2/1997 |
|----|----------|--------|
| JP | 2001-109606 | 4/2001 |
| JP | 2002-319018 | 10/2002 |

* cited by examiner

*Primary Examiner*—Edward L Coles
*Assistant Examiner*—Marcus T Riley
(74) *Attorney, Agent, or Firm*—Fitzpatrick, Cella, Harper & Scinto (57) ABSTRACT

Whether rendering instructions include designation of a logical operation is determined. If it is determined that the rendering instructions include designation of a logical operation, then the rendering instructions are developed into multivalued bitmap data every single line of the input rendering instructions and the multivalued bitmap data is subjected to color processing and binarization processing. When the rendering instructions do not include designation of a logical operation, color processing and binarization processing is executed for every color of the rendering instructions, whereby a brush is created and stored in advance. The brush is pasted into an applicable area of the rendering instructions to achieve development into binary bitmap data.

11 Claims, 8 Drawing Sheets

PRINTING CONTROL APPARATUS, METHOD AND PRINTER DRIVER

FIELD OF THE INVENTION

This invention relates to a printing control apparatus for outputting and printing print data, a method of controlling this apparatus, and a printer driver.

BACKGROUND OF THE INVENTION

Conventionally, processing of color image data by a printer driver is classified broadly into the following three types: The first is a method (a high-quality mode) that includes operating on rendering instructions from an operating system to develop bitmap data in a multivalued bitmap area (multivalue rendering), and subjecting the entirety of the multivalued bitmap area to color processing (color correction processing, multivalued color conversion processing and binarization processing) at the conclusion of developing process of all rendering instructions.

The second is a method (RGB (Red, Green, Blue) high-speed mode) that includes applying color processing (color correction) to rendering instructions from an operating system, applying binarization processing to the original RGB data to thereby create a brush, subsequently developing bit data in a binary bitmap area (RGB binary rendering), and subjecting the binary bitmap area to color processing (binary color conversion) at the conclusion of processing of all rendering instructions.

The third is a method (CMYK (Cyan, Magenta, Yellow, Black) high-speed mode) that includes applying color processing (color correction and multivalued color conversion) to render instructions from an operating system, applying binarization processing to CMYK data created by the color conversion to thereby create a brush, and subsequently developing bit data in a binary bitmap area (CMYK binary rendering).

In the high-quality mode of the first method, the multivalued bitmap data is developed and the entirety of this area is subjected to color processing. As a result, a large memory storage capacity is used. Additionally, color processing and binarization processing are required to be executed pixel by pixel and processing efficiency is poor as a consequence.

In the RGB high-speed mode of the second method, CMYK data that is eventually printed is created from binarized RGB bitmap data. As a result, image quality declines because it is impossible to alter the UCR (whether black data is expressed by CMY inks or by K ink) balance.

In the CMYK high-speed mode of the third method, the quality of the printed image is approximately the same as that in the high-quality mode. This performance is considered to be close to that of the RGB high-speed mode. The CMYK high-speed mode, however, requires that a logical operation predicated on linear independence be performed in color space of CMYK that is not linearly independent, or specifically, that has been obtained by conversion from RGB color space. Consequently, it is difficult to obtain the original ideal results. Further, depending upon the printer driver, special processing is executed if a special logical operation occurs, or logical operations having a low frequency of appearance are processed leaving defective conditions as is. As a result, few products execute print processing with the mechanism of the CMYK high-speed mode.

SUMMARY OF THE INVENTION

A feature of the present invention is to provide a printing control apparatus, a method of controlling this apparatus and a printer driver for solving the problems that arise with the conventional CMYK high-speed mode so that an output similar to that of the high-quality mode is obtained even with regard to data that includes designation of a logical operation.

According to the present invention, the foregoing object is attained by providing a printing control apparatus for outputting print data and executing printing, comprising: storage means, to which rendering instructions are input, for storing the rendering instructions page by page; first rendering means for developing rendering instructions applicable to each line into multivalued bitmap data and subjecting the multivalued bitmap data to color processing and n-value conversion processing; second rendering means for subjecting the rendering instructions to color processing and n-value conversion processing color by color of the rendering instructions, storing the results in the form of an n-valued pattern, and pasting the n-valued pattern in an applicable area of the rendering instructions to thereby achieve development into n-valued bitmap data; determining means for reading out rendering instructions that have been stored in the storage means and determining whether the rendering instructions include a rendering instruction that cannot be implemented by overwrite; and control means for exercising control so as to use the first rendering means if the determining means determines that the rendering instructions include a rendering instruction that cannot be implemented by overwrite, and use the second rendering means if the determining means determines that the rendering instructions do not include a rendering instruction that cannot be implemented by overwrite.

According to the present invention, the foregoing object is attained by providing a printing control method for outputting print data and executing printing, comprising: a storage step of inputting rendering instructions and storing the rendering instructions in a memory page by page; a first rendering step of developing rendering instructions applicable to each line into multivalued bitmap data and subjecting the multivalued bitmap data to color processing and n-value conversion processing; a second rendering step of subjecting the rendering instructions to color processing and n-value conversion processing color by color of the rendering instructions, storing the results in the form of an n-valued pattern, and pasting the n-valued pattern in an applicable area of the rendering instructions to thereby achieve development into n-valued bitmap data; a determining step of determining whether rendering instructions that have been read out of the memory include a rendering instruction that cannot be implemented by overwrite; and a control step of exercising control so as to use the first rendering step if it is determined at the determining step that the rendering instructions include a rendering instruction that cannot be implemented by overwrite, and use the second rendering step if it is determined at the determining step that the rendering instructions do not include a rendering instruction that cannot be implemented by overwrite.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will now be described in detail with reference to the accompanying drawings. It should be noted that this embodiment will be described with regard to an example in which the embodiment is applied to a system in which a host apparatus and a printing apparatus are connected by a Centronics interface. However, the present invention is not limited to this embodiment. More specifically, the interface system is not an important structural requisite in the invention of this application and it is possible to employ an infrared communication interface, a wireless communication interface, a USB interface or an interface defined by IEEE 1394, or another type of network connection.

Figure 1:
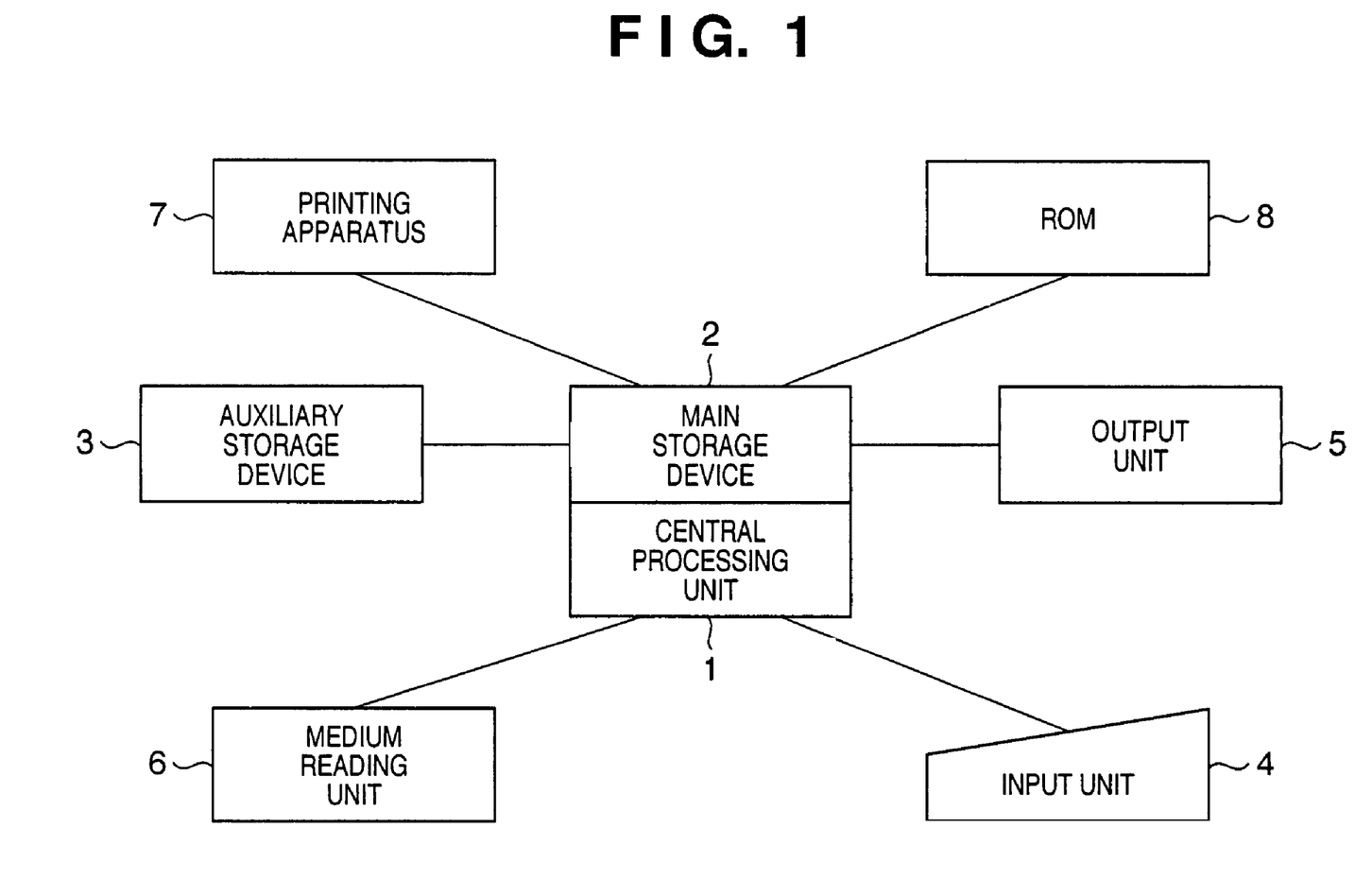
FIG. 1 is a block diagram illustrating an example of the configuration of an information processing system according to an embodiment of the present invention.

FIG. 1 is a block diagram illustrating an example of the configuration of an information processing system according to an embodiment of the present invention.

As shown in FIG. 1, the system includes a central processing unit 1 for reading in a program and related data, which are for executing control according to this embodiment, from a medium reading unit 6, in which a storage medium such as a floppy disk, a CD-ROM or an IC memory card is inserted, or from an auxiliary storage device 3, loading the program and data in a main storage device (RAM) 2 and executing the program, thereby performing various kinds of control, described later. The main storage device 2 also provides a work area for when the central processing unit 1 executes various processing.

The auxiliary storage device 3 is a large-capacity storage device such as a hard disk or magneto-optic disk. An input unit 4 is equipped with a keyboard and a pointing device such as a mouse. An output unit 5 is equipped with, e.g., a display device. A printing apparatus (printer) 7 is a printer such as an electro-photographic printer or an ink-jet printer. A ROM 8 is a booting ROM and stores a program for when the central processing unit 1 is started up.

In this embodiment, the output unit 5 is assumed to be a display device such as a monitor to distinguish it from the printer which ordinarily is included among output units. Further, the auxiliary storage device 3 may be constituted by a hard disk or magneto-optic disk or by a combination of these disks. Further, these devices may be connected via a network.

Figure 2:
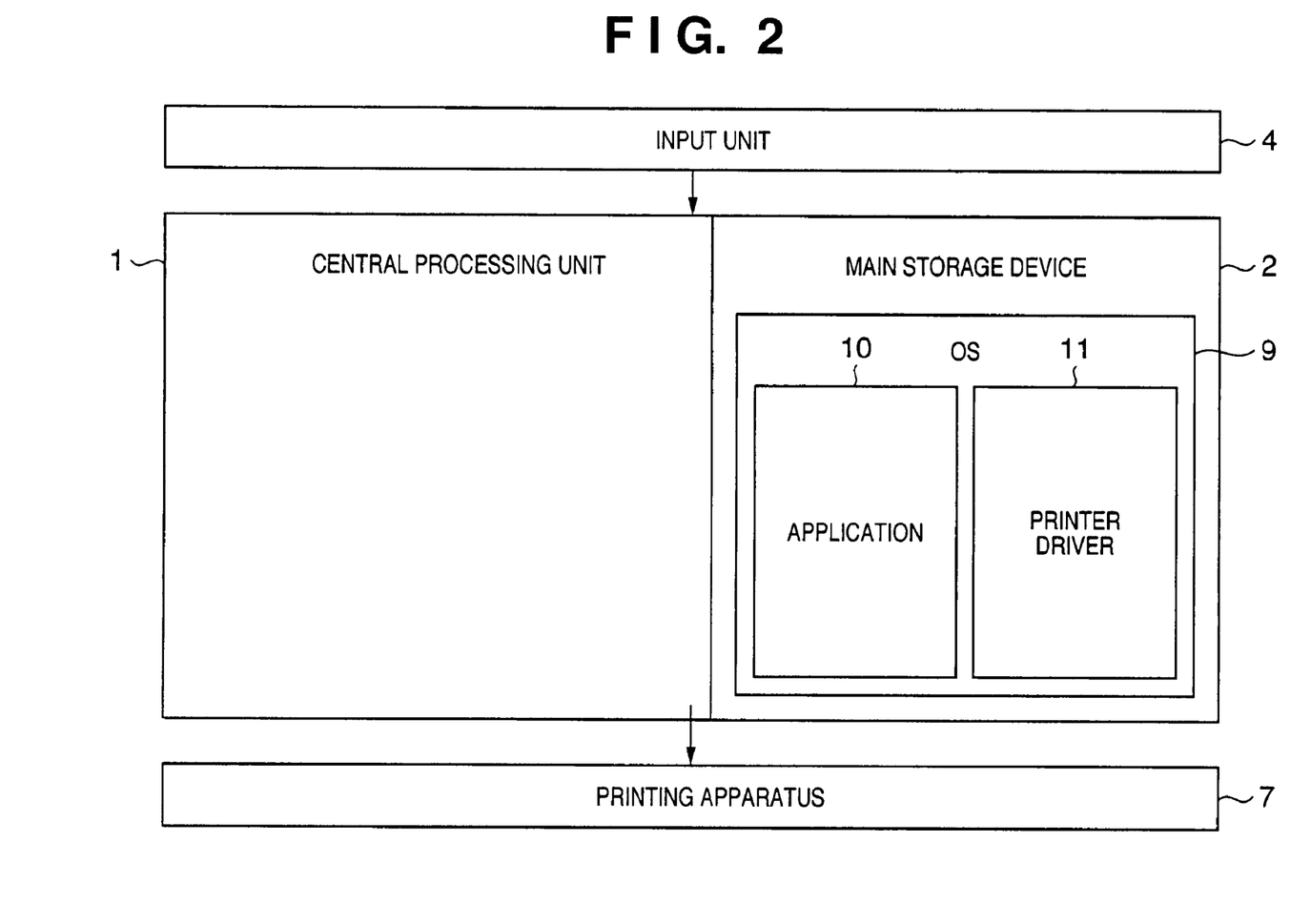
FIG. 2 depicts a conceptual view useful in describing the functional implementations of a central processing unit and main memory device according to this embodiment.

FIG. 2 depicts a block diagram for describing the functional implementations of the central processing unit 1 and main storage device 2 according to this embodiment.

The control program and related data stored in the medium reading unit 6 or auxiliary storage device 3 for the purpose of executing an image processing method according to this embodiment are read into the main storage device (RAM) 2 by the central processing unit 1 and the program is executed by the central processing unit 1. FIG. 2 is a conceptual view covering operation from input of a print instruction from the input unit 4 to output of data to the printing apparatus 7 and printing of the data by the printing apparatus 7. In this embodiment, it is assumed that an application 10 and driver 11 are executed under the control of an operating system 9.

Figure 3:
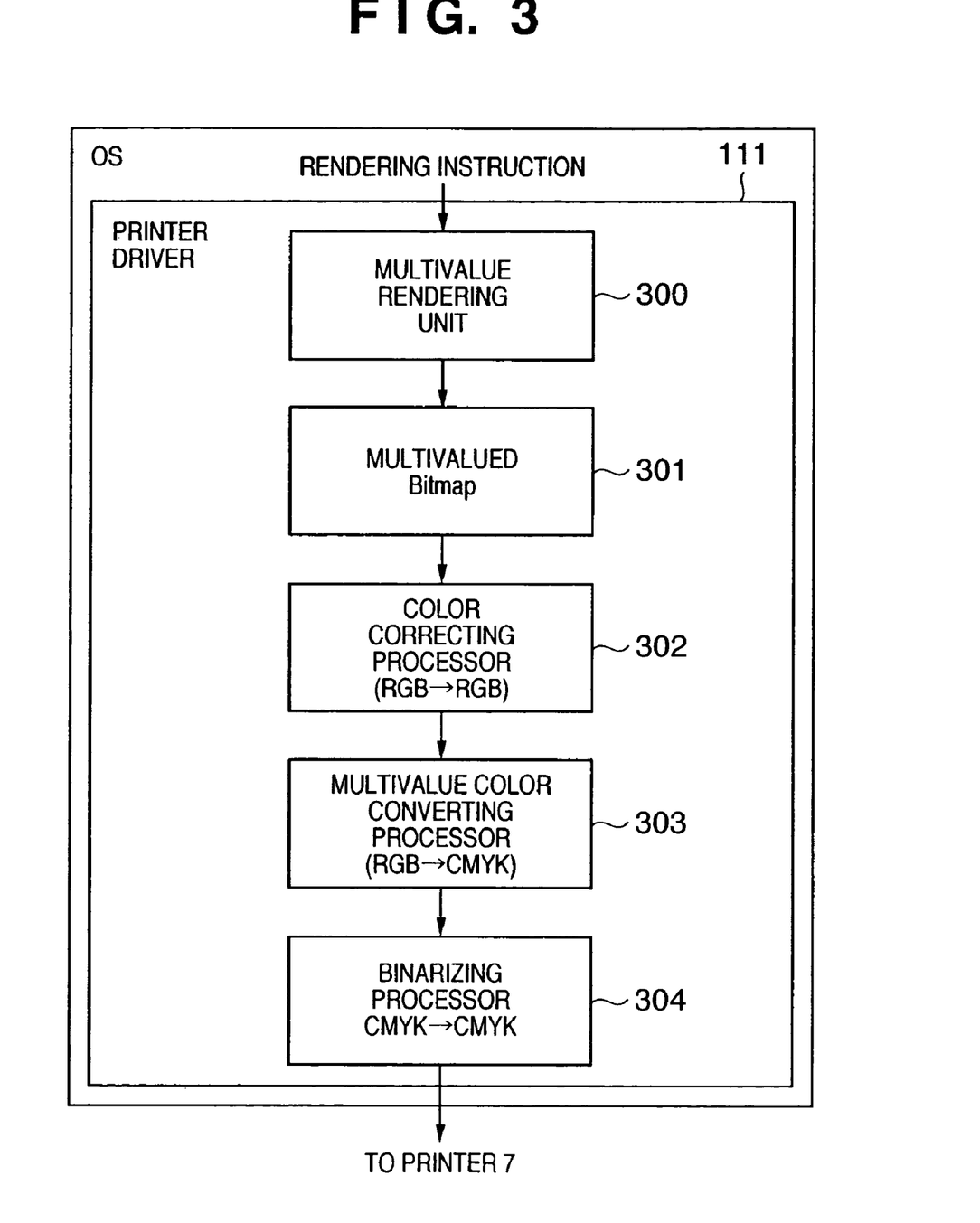
FIG. 3 is a flowchart illustrating the flow of processing by an ordinary printer driver in the high-quality printing mode.

FIG. 3 is a flowchart illustrating the flow of processing in a high-quality printing mode implemented by an ordinary printer driver 111. (This corresponds to the first method described earlier in the background of the invention.)

When rendering instructions arrive from the operating system 9, the printer driver 111 develops the rendering instructions into multivalued bitmap data (RGB) 301 by a multivalue rendering unit 300. The multivalued bitmap data (RGB) 301 obtained by the development is subjected to color-correction processing by a color correcting processor 302. A multivalue color converting processor 303 executes multivalued color conversion processing (RGB→CMYK) and creates CMYK multivalued data. Furthermore, binarization processing is executed by a binarizing processor 304 to create CMYK binary data, which is transferred to the printer 7. The color correction by the color correcting processor 302 may be executed before the development into the multivalued bitmap data 301 or after the development into the multivalued bitmap data 301.

Figure 4:
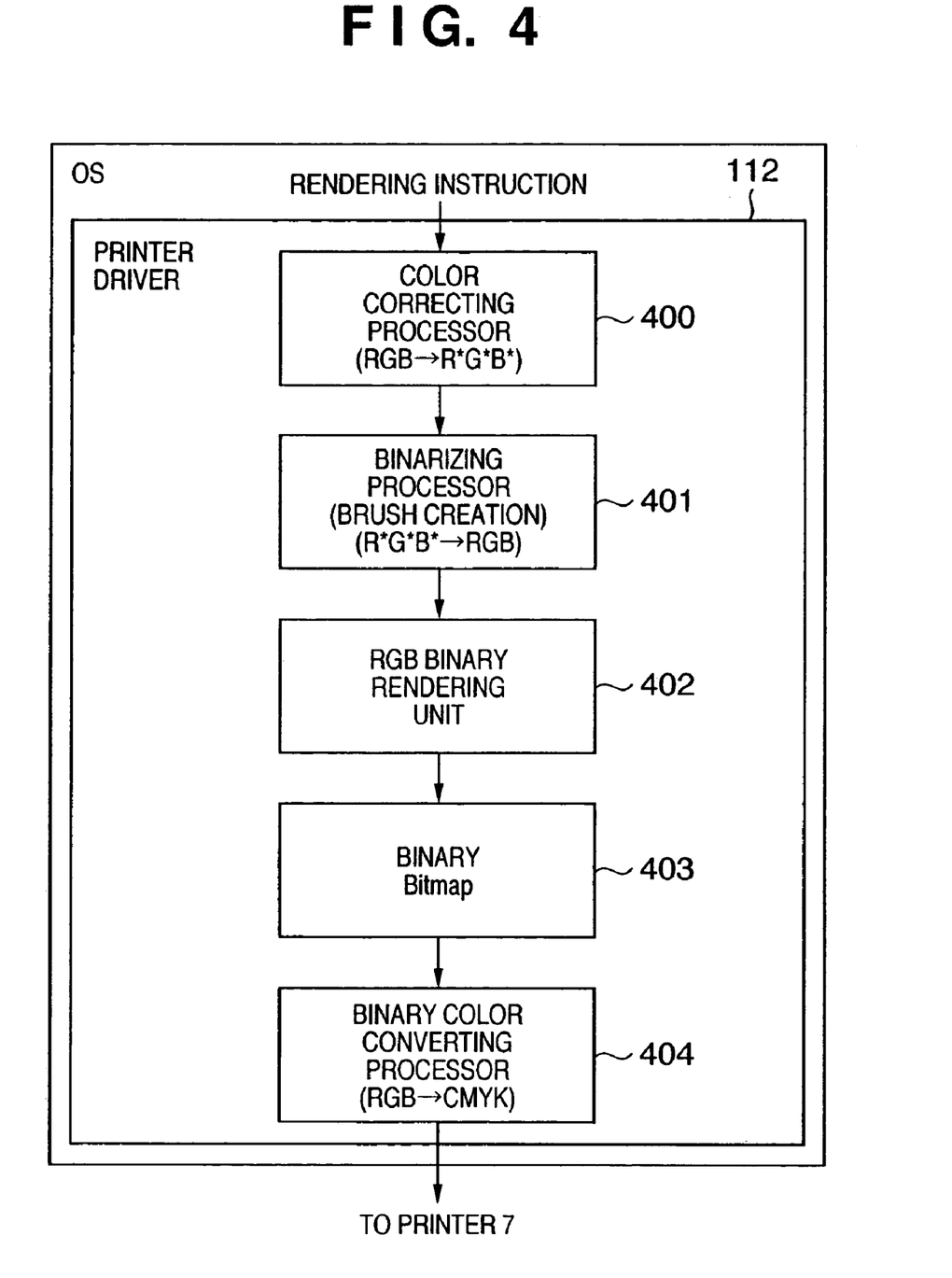
FIG. 4 is a flowchart illustrating the flow of processing by an ordinary printer driver in the RGB high-speed printing mode.

FIG. 4 is a diagram illustrating the flow of processing by an ordinary printer driver 112 in an RGB high-speed printing mode. (This corresponds to the second method described earlier in the background of the invention.)

When rendering instructions arrive from the operating system 9, the printer driver 112 subjects the rendering instructions to color correction processing by a color correcting processor 400 and converts RGB data to R*G*B* data. Next, the R*G*B* data is converted to binary RGB data by a binarizing processor 401. The binary bitmap data (RGB) thus binarized is developed in a bitmap area by an RGB binary rendering unit 402 to thereby generate binary bitmap data 403. The binary bitmap data 403 is converted to binary CMYK data by a binary color converting processor 404.

If such processing is executed, print processing will take place at high speed. However, since UCR processing (a designation as to whether black data is output as K or as CMY) by a binary color conversion (RGB→CMYK) is not effective, the output results are not the best.

Figure 5:
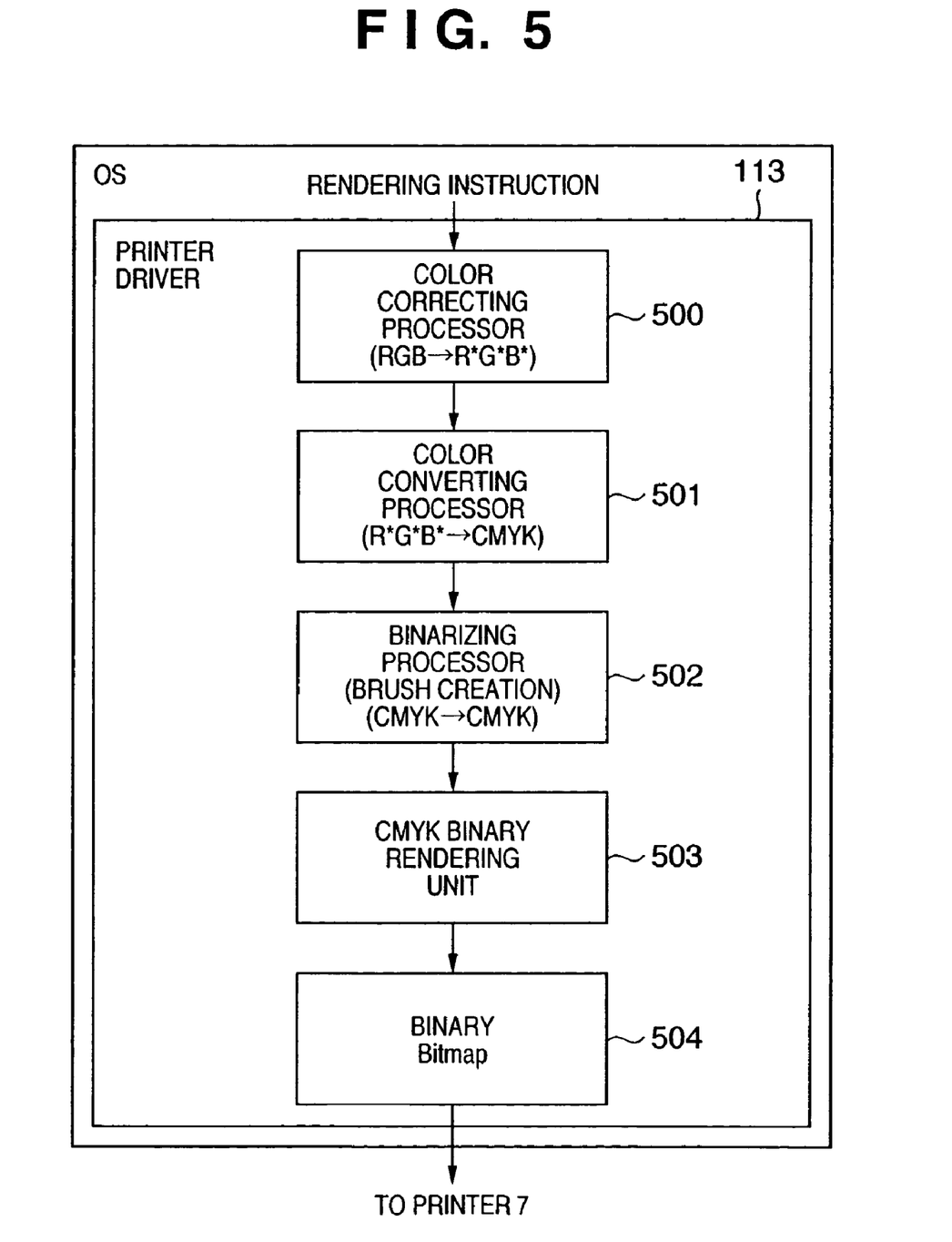
FIG. 5 is a flowchart illustrating the flow of processing by an ordinary printer driver in the CMYK high-speed printing mode.

FIG. 5 is a diagram illustrating the flow of processing by an ordinary printer driver 113 in a CMYK high-speed printing mode. (This corresponds to the third method described earlier in the background of the invention.)

When rendering instructions arrive from the operating system 9, the printer driver 113 subjects the rendering instructions to color correction processing by a color correcting processor 500 and converts RGB data to R*G*B* data. Next, the R*G*B* data is converted to CMYK data by a color converting processor 501. This CMYK data is then converted to binary CMYK data by a binarizing processor 502. Next, the binary bitmap data (CMYK) thus binarized is developed in a bitmap area by a CMYK binary rendering unit 503 to thereby generate binary bitmap data 504.

In this high-speed printing mode, color processing (color correction, color conversion and binarization processing) is the same as that of the high-quality printing mode of FIG. 4 and in general, therefore, an output that is identical with that of the high-quality mode can be created. When rendering processing that requires implementation of a logical operation is executed, however, the logical operation is performed not between RGB data, which is linearly independent data, but between data that is not linearly independent, such as CMYK data. Consequently, there is a possibility that appropriate output results will not be obtained.

Figure 6:
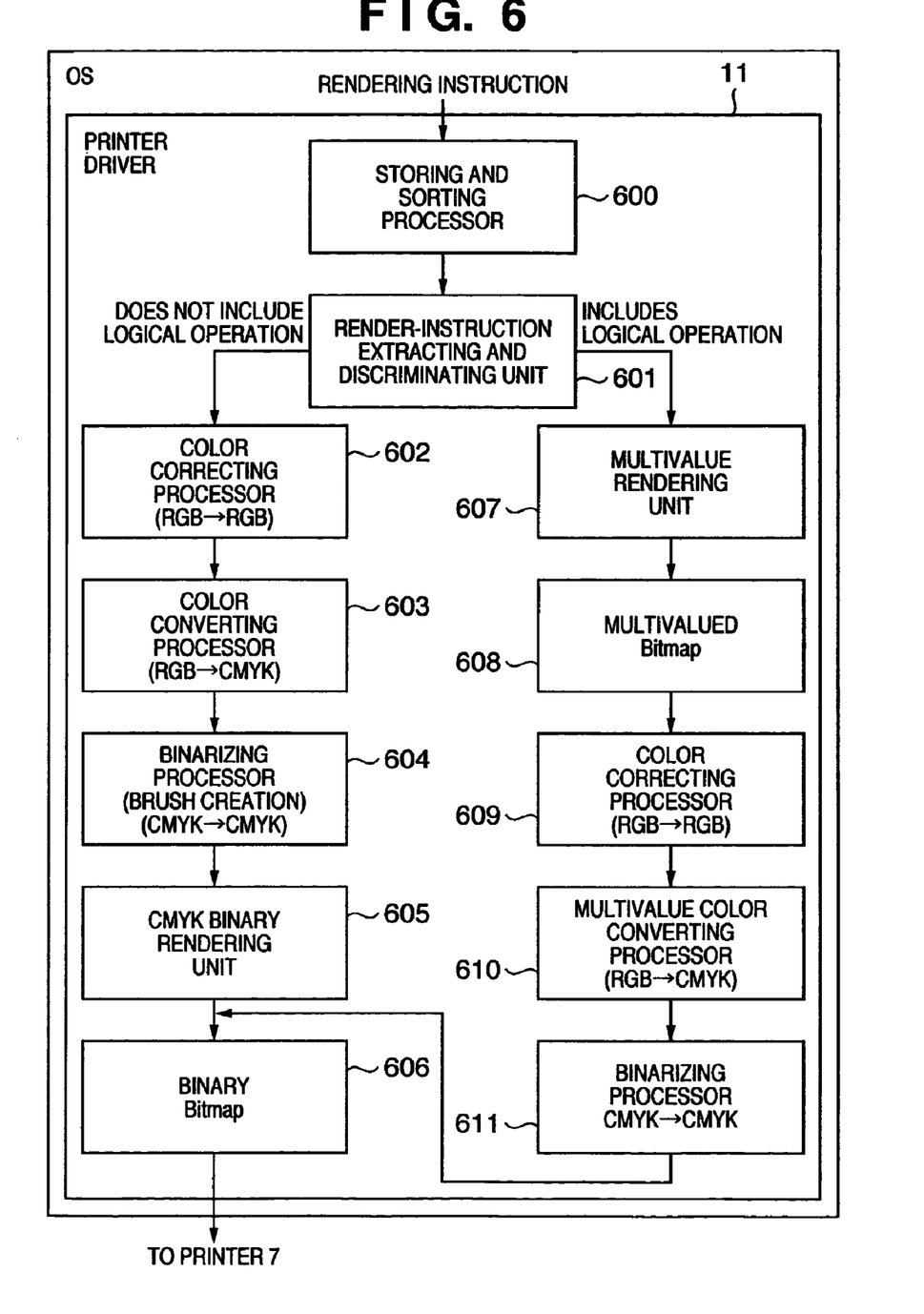
FIG. 6 is a flowchart for describing the flow of processing in a high-quality, high-speed printing mode according to the embodiment of the present invention.

FIG. 6 is a flowchart for describing a high-quality, high-speed printing mode by the printer driver 11 according to this embodiment of the present invention.

This embodiment is such that when rendering instructions are delivered from the application 10, the printer driver 11 stores one page of the rendering instructions and sorts the instructions by a processing unit 600 for storing and sorting the rendering instructions. At this time the data stored may be the rendering instructions per se, but it is also possible to store the data upon converting the instructions to an intermediate language that facilitates rendering subsequently. Further, though it is efficient to perform sorting by rearranging the rendering instructions in order from the top, this is not essential and the instructions may be stored without being sorted.

When storage of one page of the rendering instructions by the storing and sorting processing unit 600 ends, rendering processing on a per-scanning-line basis is executed in order starting from the top. In this case, a render-instruction extracting and discriminating unit 601 extracts the rendering instructions pertaining to a scanning line and determines whether the rendering instructions of the scanning line include even one for processing, such as logical operation processing or transparency processing other than overwrite, that may cause a rendering irregularity in CMYK binary rendering.

In CMYK binary rendering, it is determined whether a cause of rendering irregularity, that is logical operation processing or transparency processing, exists. If such processing is non-existent, then color processing (color correction) by a color correcting processor 602 and color conversion processing by a color converting processor 603 is executed in line with the flow of processing in the CMYK high-speed printing mode indicated at 602 to 606 in FIG. 6 corresponding to 500 to 504 in FIG. 5. A binarizing processor 604 then creates a brush (a binarization pattern) by binarization processing, after which a CMYK binary rendering unit 605 develops the data into binary bitmap data (CMYK) 606.

On the other hand, if the render-instruction extracting and discriminating unit 601 determines the existence of processing that may cause a rendering irregularity in CMYK binary rendering, then processing is executed in line with the flow of processing in the high-quality printing mode indicated at 607 to 611 in FIG. 6 corresponding to 300 to 304 in FIG. 3. That is, rendering instructions pertaining to a scanning line are subjected to multivalue rendering by a multivalue rendering unit 607 to thereby create multivalued bitmap data 608. The multivalued bitmap data 608 is then subjected to a color correction by a color correcting processor 609 and processing for a color conversion from RGB data to CMYK data is executed by a multivalue color converting processor 610. Processing for binarizing the CMYK data is then executed by a binarizing processor 611 to thereby create binary CMYK bitmap data 606. Such processing is applied to all scanning lines on one page.

It should be noted that the data that is output to the printer 7 is assumed to be binary bitmap data that is the result of binarization. This, however, does not impose a limitation upon the present invention and the invention can be realized similarly even in case of four values for each of the colors of CMYK, by way of example. Further, the color correcting processor 602 may just as well be provided in front of the storing and sorting processing unit 600.

It is not necessarily required that processing be executed one scanning line at a time. As long as there is no changeover between a multivalued rendering system and a CMYK binary rendering system, the invention can be implemented in similar fashion even if processing is executed a plurality of lines at a time.

Figure 7A:
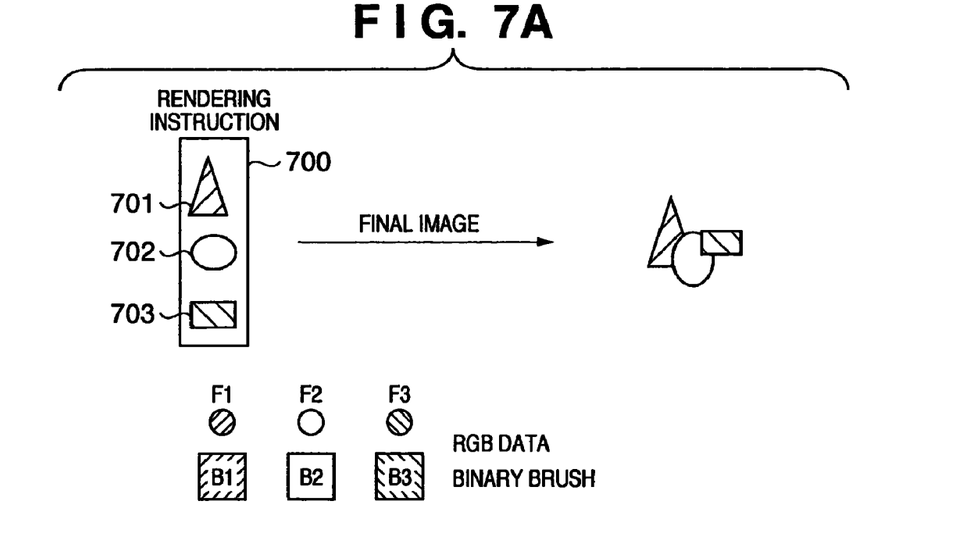
FIGS. 7A to 7C depict diagrams useful in describing processing for switching between multivalue rendering and CMYK rendering on a per-scanning-line basis.
Figure 7B:
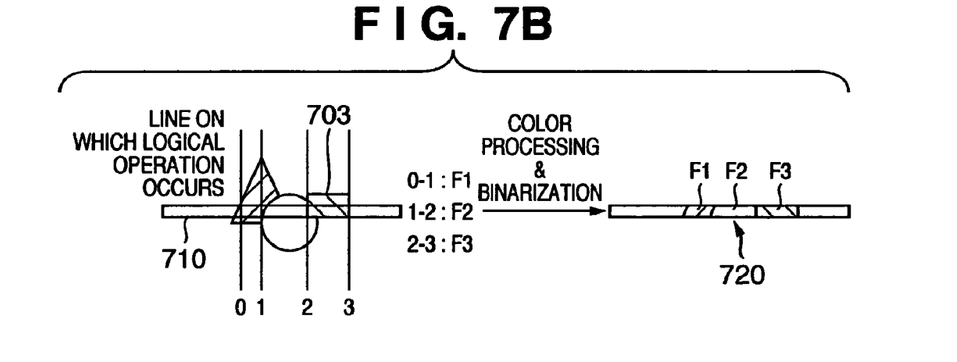
Figure 7C:
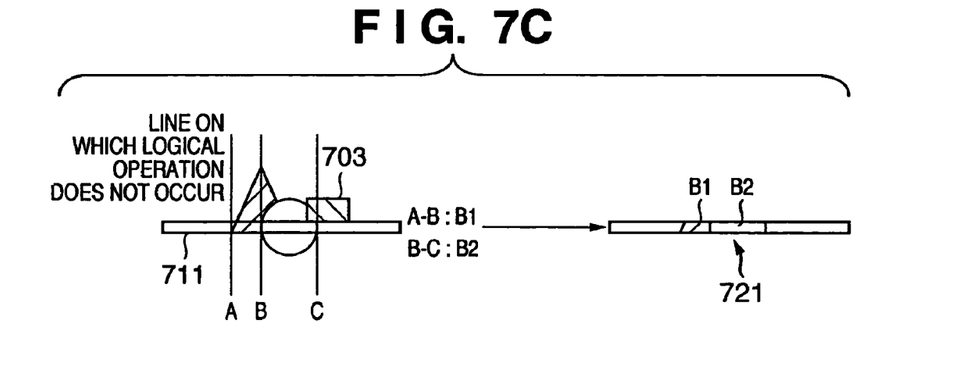

FIGS. 7A to 7C illustrate a specific example of discrimination processing in the render-instruction extracting and discriminating unit 601 and subsequent splitting into multi-valued rendering and CMYK binary rend ring.

In FIG. 7A, a rendering instruction 700 that includes drawing objects 701 to 703 is input. If the rendering instruction 700 includes an object 703 that is accompanied by a logical operation, RGB data (F1, F2, F3) corresponding to respective ones of the objects and brushes (B1, B2, B3) corresponding to respective ones of the objects created by binarization after application of color processing are created in advance and the edge of each drawing object is extracted on a per-scanning-line basis.

FIG. 7B illustrates a case where the object 703 that gives rise to a logical operation is present on a scanning line 710. Here RGB data (F1, F2, F3) is used to create one scanning line of multivalued bitmap data. More specifically, RGB data (F1) of object 701 is disposed between edges "0" and "1", RGB data (F2) of object 702 is disposed between edges "1" and "2", and RGB data (F3) of object 703 is disposed between edges "2" and "3". This is followed by executing color processing and binarization processing to create binary bitmap data 720 of scanning line 710.

FIG. 7C illustrates a case where the object 703 that gives rise to a logical operation is not present on a scanning line 711. In this case, binary bitmap data 721 of scanning line 711 is created by pasting a binary brush (B1) of object 701 between edges "A" and "B" and a binary brush (B2) of object 702 between edges "B" and "C".

Thus, binary bitmap data of each scanning line is created and the binary bitmap data of all of the scanning lines is finally collected together so that binary bitmap data of the entire page can be created.

Phase or the like at the time of binarization naturally is made to conform perfectly in FIGS. 7B and 7C so that irregular rendering will not occur in changing over the processing method.

Figure 8:
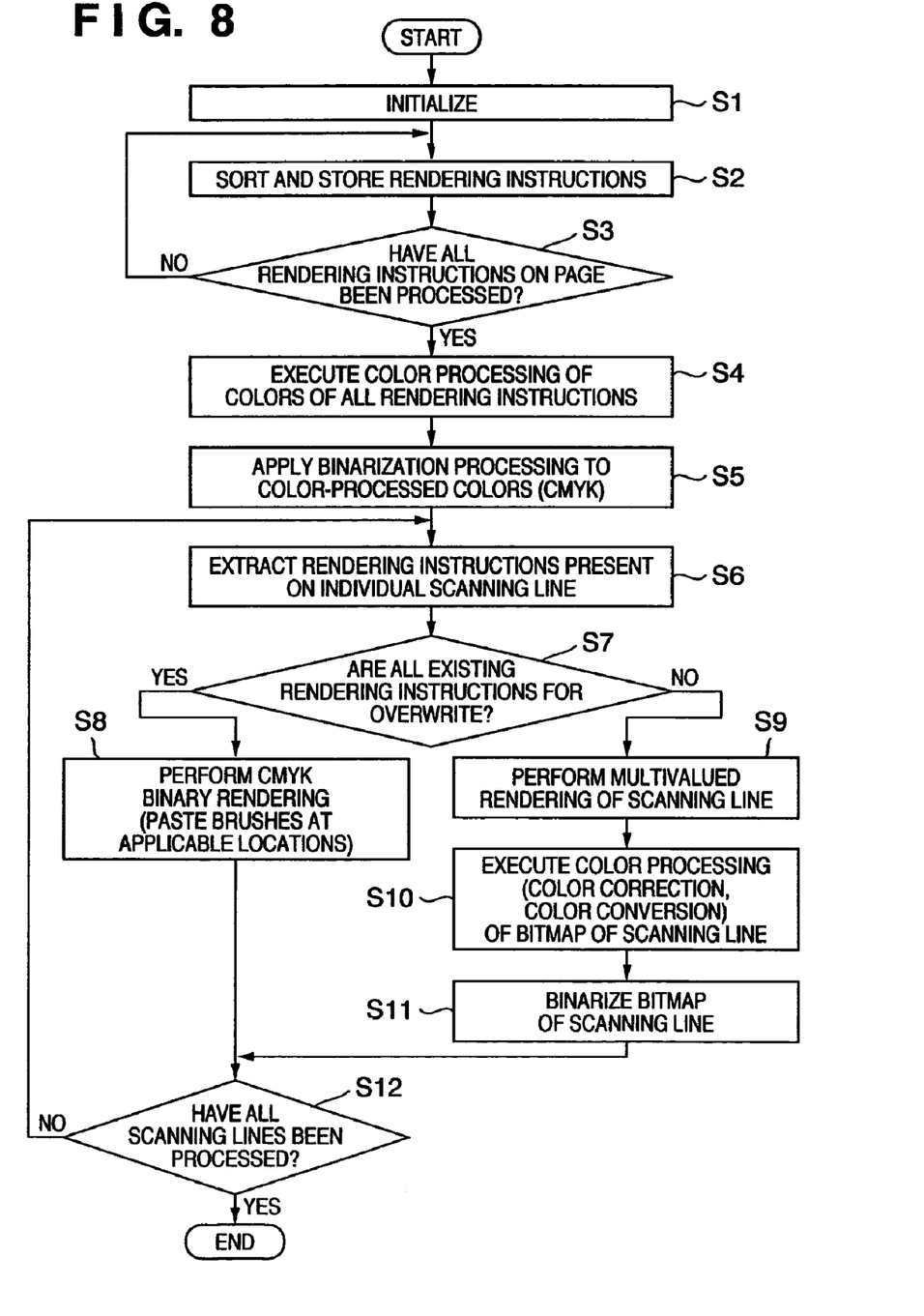
FIG. 8 is a flowchart for describing image processing in an information processing system according to this embodiment.

FIG. 8 is a flowchart for describing print processing by the printer driver 11 according to this embodiment.

First, if an instruction for executing printing is input from the input unit 4, the operating system 9 accepts a message to this effect. The operating system 9 sends a print execution message to the application 10, which is currently active. As a result, the application 10 converts this message to a command that can be recognized by the operating system 9 and transmits the data to be printed and the command message. In response, the operating system 9 converts the command to one that can be recognized by the printer driver 11 and sends the message, whereby the processing shown by this flowchart is started.

First, at step S1, an area for storing bitmap data of the main storage device 2 and a storage area for the rendering instructions are placed in the memory space of the main storage device 2 and the contents thereof are cleared when an initializing message is sent to the printer driver 11. Next, control proceeds to step S2, at which the printer driver 11 stores rendering instructions, which are sent from the operating system 9, while sorting the instructions from the top. This storage processing is executed until all rendering instructions of the page are stored.

When all of the rendering instructions are thus stored in the storage area of the main storage device 2 at step S3, control proceeds to step S4, at which color processing is applied to the colors of all of the rendering instructions stored. Control then proceeds to step S5, at which binarization processing is applied to these colors (CMYK multivalued) to create brushes.

When color processing and brush creation end, control proceeds to step S6, at which the scanning line at the top of the page is taken as the scanning line of interest and the rendering instructions present on this line are extracted. It is then determined at step S7 whether all of the extracted rendering instructions are for overwrite and that there are no logical operations or transparency attributes present (this corresponds to the determination made by the render-instruction extracting and discriminating unit 601). If all rendering instructions are for overwrite and no logical operations or transparency attributes exist, control proceeds to step S8, at which CMYK binary rendering is executed. The processing executed here entails extracting the edges of objects on the scanning line, acquiring the edges as integral values and pasting the brushes of the objects, which were created at step S5, within the edges (this corresponds to the processing of FIG. 7C). As a result, the scanning line's worth of CMYK binary bitmap data is created. Control then proceeds to step S12, at which it is determined whether the processing of all scanning lines on this page has been completed. If this processing has not been completed, control returns to step S6, where the next scanning line is adopted as the scanning line of interest and the above-described processing is executed.

If it is found at step S7 that even one logical operation or a transparency attribute other than overwrite exists in extracted rendering instructions, control proceeds to step S9, where multivalued rendering is carried out. The processing executed here entails extracting the edges of objects on the scanning line, acquiring the edges as integral values and pasting the original colors (RGB multivalued) within the edges. As a result, the scanning line's worth of RGB multivalued bitmap data is created. Control then proceeds to step S10, at which color processing is applied to this scanning line of multivalued bitmap data, and then to step S11, at which the multivalued bitmap data is subjected to binarization processing to thereby create the CMYK binary bitmap data of this scanning line (this corresponds to FIG. 7B). Control then proceeds to step S12. The above-described processing is repeatedly executed until binary bitmap data of all scanning lines on the page has been created.

The embodiment of the present invention described above is characterized by the following: A rendering area of rendering instructions in which a logical operation has been specified (namely a rendering instruction for overwrite processing will not suffice) undergoes rendering into a multivalued bitmap with the original color space of the image left as is, a color correction is then applied, then a color conversion is made to another color space and finally binarization is performed. On the other hand, a rendering area of rendering instructions in which a logical operation has not been specified is subjected to a color correction at the start, a color conversion is made to another color space and finally binarization is performed to achieve rendering. Since it is thus required to make a judgement, not on a per-rendering instruction basis, but on a per-final-rendering-area basis, storing temporarily at least one page's worth of all rendering instructions is essential. In such a case, the rendering instructions within the page are actually sorted in the Y (vertical) and X (horizontal) directions. This embodiment is such that spooled rendering instructions are developed into bitmap data in order from the top on a per-scanning-line basis. Such developing process is a characterizing feature of this embodiment.

In a case where the scanning line includes only rendering instructions of overwrite processing, a conversion is made to an n-valued bitmap by second rendering means (an n-valued bitmap expansion). On the other hand, if the scanning line includes even one rendering instruction other than for overwrite, a 24-bit bitmap is created by first rendering means (a multivalued bitmap development), color processing is applied to the 24-bit bitmap to effect a conversion to a CMYK 32-bit bitmap, and then binarization processing is executed to create a binarized bitmap. This is a characterizing feature of the embodiment.

It should be noted that the content of color conversion processing and that of the n-value conversion (binarization) processing implemented in the first and second rendering means are identical. What is different is that, whereas the first rendering means performs the color conversion and n-value conversion processing after bitmap development, the second rendering means develops the bitmap after the color conversion and n-value conversion processing. In other words, in the case where a scanning line includes only rendering instructions of overwrite processing, the output is the same, and only the processing procedure differs, even if first rendering (multivalued rendering) is used.

Accordingly, with regard to a scanning line on which a rendering instruction for which overwrite processing will not suffice exists, first rendering is applied, or specifically, the render instruction is developed (rendered) into a multivalued bitmap in the original image color space, a color correction and processing for a color conversion to another color space are executed, and finally a conversion to n(2) values (binarization) is performed. On the other hand, with regard to a scanning line that includes just rendering instructions for which only overwrite processing will suffice, a second rendering is applied, or specifically, a color correction is executed first and processing for a color conversion to another color space is executed, a conversion to n values is performed to create a pattern and finally render the pattern.

It should be noted that if, by way of example, a rendering instruction indicates a 1 cm×1 cm square, the number of pixels in the square is about 60,000 in a case where the resolution is 600 dpi. In other words, with multivalue rendering, it is necessary to convert pixel data of 60,000 points to a bitmap, apply an RGB→CMYK color conversion to each of the pixels of 60,000 points and apply binarization processing to each of the pixels of 60,000 points. By contrast, with the second rendering means, in case of a dither matrix of 16×16=256, it suffices to apply the RGB→CMYK color conversion to 256 points, apply binarization processing to 256 points to create a pattern of 256 points, and paste this to the area (square area) of 60,000 pixels to thereby achieve bitmapping. The result is a major increase in performance.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the embodiment and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc. Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

Though the embodiment has been illustrated in a system in which processing is executed on the host side, the processing can be processing on the printer side and the processing will by exactly the same even if render instructions are implemented within the printer as, e.g., PDL commands.

The present invention is not limited to the above embodiments and various changes and modifications can be made within the spirit and scope of the present invention. Therefore, to apprise the public of the scope of the present invention, the following claims are made.

What is claimed is:

1. A printing control apparatus for outputting print data and executing printing, comprising:
   storage means, to which rendering instructions are input, for storing the rendering instructions page by page;
   processing means for performing color processing and n-value conversion processing of the rendering instructions stored in the storage means;
   first rendering means for developing the rendering instructions of each scan line into multivalued bitmap data, performing color processing of the multivalued bitmap data and converting the color processed multivalued bitmap data to n-valued bitmap data, wherein the number of bits associated with the multivalued bitmap data is greater than n;
   second rendering means for performing rendering processing by pasting n-valued data converted by the n-value conversion processing into an object corresponding to the rendering instructions to generate n-valued bitmap data;
   determining means for reading out the rendering instructions that have been stored in the storage means and determining whether the rendering instructions include a rendering instruction other than overwriting for each scan line after the processing means has processed the rendering instructions; and
   control means for extracting edges of objects in the rendering instructions in each scan line and exercising control so as to cause the first rendering means to render the multivalued bitmap data between the edges to convert into the n-valued bitmap data of the scan line if the determining means determines that the rendering instructions include a rendering instruction other than the overwriting for a scan line, and to cause the second rendering means to generate the n-valued bitmap data of the scan line if the determining means determines that the rendering instructions do not include a rendering instruction other than the overwriting for the scan line,
   wherein the control means causes the first rendering means or the second rendering means to develop the rendering instructions into the n-valued bitmap data line by line, and
   wherein a phase at the time of conversion to the n-valued bitmap data by the first rendering means is made to conform with a phase at the time of generation of the n-valued bitmap data by the second rendering means, such that irregular rendering is suppressed in switching between the first rendering means and the second rendering means.

2. The apparatus according to claim 1, wherein the storage means sorts and stores entered rendering instructions, and the first and second rendering means read out and process the rendering instructions in the order in which they have been sorted and stored in the storage means.

3. The apparatus according to claim 2, wherein the sorting order is in a direction from the top to the bottom of a page.

4. The apparatus according to claim 1, wherein the value of n is 2.

5. A printing control method for outputting print data and executing printing, comprising:
   using a processor to perform:
   a storage step of inputting rendering instructions and storing the rendering instructions in a memory page by page;
   a processing step of performing color processing and n-value conversion processing of the rendering instructions stored in the storage step;
   a first rendering step of developing the rendering instructions of each scan line into multivalued bitmap data, performing color processing of the multivalued bitmap data and converting the color processed multivalued bit map data to n-valued bitmap data, wherein the number of bits associated with the multivalued bitmap data is greater than n;
   a second rendering step of performing rendering processing by pasting n-valued data converted by the n-value conversion processing into an object corresponding to the rendering instructions to generate n-valued bitmap data;
   a determining step of determining whether the rendering instructions that have been read out of the memory include a rendering instruction other than overwriting for each scan line after the processing step has processed the rendering instructions; and a control step of extracting edges of objects in the rendering instructions in each scan line and exercising control so as to cause the first rendering step to render the multivalued bitmap data between the edges to convert into the n-valued bitmap data of the scan line if it is determined in the determining step that the rendering instructions include a rendering instruction other than the overwriting for a scan line, and to cause the second rendering step to generate the n-valued bitmap data of the scan line if it is determined in the determining step that the rendering instructions do not include a rendering instruction other than the overwriting for the scan line, wherein the control step includes causing execution of the first rendering step or the second rendering step to develop the rendering instructions into the n-valued bitmap data line by line, and wherein a phase at the time of conversion to the n-valued bitmap data in the first rendering step is made to conform with a phase at the time of generation of the n-valued bitmap data in the second rendering step, such that irregular rendering is suppressed in switching between the first rendering step and the second rendering step.

6. The method according to claim 5, wherein inputted rendering instructed are sorted and stored in the memory in the storage step, and the rendering instructions are read out and processed in the first and second rendering steps in the order in which they have been sorted and stored in the memory.

7. The method according to claim 6, wherein the sorting order is in a direction from the top to the bottom of a page.

8. A printer driver for receiving rendering instructions from an application, creating print data and outputting the print data to a printing apparatus, comprising:

storage means, to which rendering instructions are input from the application, for storing the rendering instructions in a memory page by page;

processing means for performing color processing and n-value conversion processing of the rendering instructions stored in the storage means;

first rendering means for expanding the rendering instructions of each scan line, which rendering instructions have been stored in the memory, into multivalued bitmap data, performing color processing of the multivalued bitmap data and converting the color processed multivalued bitmap data to n-valued bitmap data, wherein the number of bits associated with the multivalued bitmap data is greater than n;

second rendering means for performing rendering processing of by pasting n-valued data converted by the n-value conversion processing into an object corresponding to the rendering instructions to generate n-valued bitmap data;

determining means for reading out the rendering instructions that have been stored in the memory and determining whether the rendering instructions include a rendering instruction other than overwriting for each scan line after the processing means has processed the rendering instructions; and control means for extracting edges of objects in the rendering instructions in each scan line and exercising control so as to cause the first rendering means to render the multivalued bitmap data between the edges to convert into the n-valued bitmap data of the scan line if the determining means determines that the rendering instructions include a rendering instruction other than the overwriting for a scan line, and to cause the second rendering means to generate the n-valued bitmap data of the scan line if the determining means determines that the rendering instructions do not include a rendering instruction other than the overwriting for the scan line, wherein the control means causes the first rendering means or the second rendering means to develop the rendering instructions into the n-valued bitmap data line by line, and wherein a phase at the time of conversion to the n-valued bitmap data by the first rendering means is made to conform with a phase at the time of generation of the n-valued bitmap data by the second rendering means, such that irregular rendering is suppressed in switching between the first rendering means and the second rendering means.

9. The printer driver according to claim 8, wherein the first rendering means includes:

means for generating multivalued bitmap data based upon the rendering instructions;

first color correcting means for performing a color correction of the multivalued bitmap data;

first color converting means for converting colors of the multivalued bitmap data that has been subjected to the color correction by the first color correcting means to multivalued bitmap data of another color space; and n-value converting means for subjecting the multivalued bitmap data that has been subjected to the color conversion by the first color converting means to an n-value conversion.

10. A printer driver according to claim 8, wherein the second rendering means includes:

second color correcting means for correcting colors of an image included in the rendering instructions;

second color converting means for converting colors of the image that has been subjected to the color correction by the second color correcting means to colors of another color space;

image n-value converting means for subjecting the image data of the image that has been subjected to the color conversion by the second color converting means to an n-value conversion and creating an n-valued pattern; and means for creating n-valued bitmap data based upon the n-valued pattern obtained by the n-value conversion performed by the image n-value converting means.

11. The apparatus according to claim 1, wherein the processing means performs the color processing and n-value conversion processing of all rendering instructions of a page to be processed that are stored in the storage means.

* * * * *